(No Model.)

A. P. MASSEY.
PIPE COUPLING.

No. 543,602. Patented July 30, 1895.

WITNESSES:
R. C. Augur
W. H. Ford

INVENTOR
Albert P. Massey

UNITED STATES PATENT OFFICE.

ALBERT P. MASSEY, OF WATERTOWN, NEW YORK.

PIPE-COUPLING.

SPECIFICATION forming part of Letters Patent No. 543,602, dated July 30, 1895.

Application filed January 7, 1895. Serial No. 534,078. (No model.)

*To all whom it may concern:*

Be it known that I, ALBERT P. MASSEY, a citizen of the United States, and a resident of Watertown, Jefferson county, New York State, have invented a new and useful Improvement in Pipe-Couplings, of which the following is a specification.

My invention relates to couplings for hose or pipes which are used for conveying air under pressure. Such couplings are usually made so that any two of them will interlock with each other by a partial rotation and form a connection between the hose to which they may be attached.

My improvement consists in placing in each coupling a valve to close the passage when the coupling is detached and in placing said valve under the control of a piston moved by air-pressure to open said valve when a pair of couplings are properly coupled together.

Figure 2:
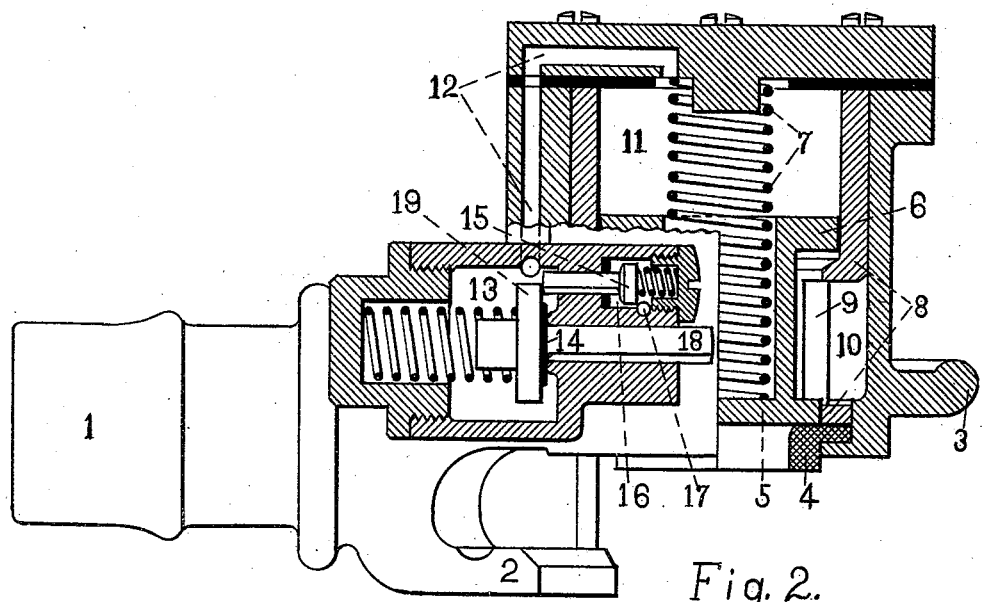
Figure 1:
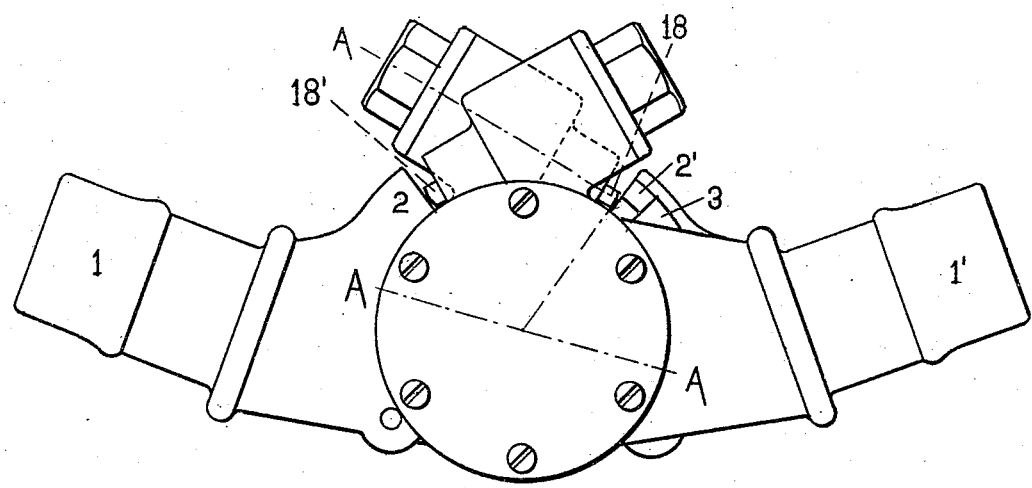

Figure 1 shows a pair of couplings connected for service. Fig. 2 is a sectional view of one coupling on the line A A A, showing the internal construction.

1 is a hollow shank to which hose may be attached.

2 is a lip and 3 is a tongue, which engage with the corresponding tongue and lip of any coupling that may be connected to it.

4 is a rubber gasket which forms a joint when in contact with a similar gasket in the other coupling.

5 is a valve which closes the opening through gasket 4 when the coupling is detached.

6 is a piston connected to valve 5. The spring 7 tends to hold valve 5 upon its seat.

8 is a cylindrical shell that forms a cylinder for piston 6, and also serves to hold gasket 4 in its recess.

9 is an opening through shell 8 that allows air to flow freely from the chamber 10, which is open to the hollow shank 1. There are several of these openings.

11 is a chamber above piston 6, which is connected by passage 12 with chamber 13. A valve 14 controls a port from chamber 13 to the open air.

15 is a valve controlling a port between chamber 13 and chamber 16. Chamber 16 is connected to chamber 10 by passage 17.

The moving parts are all shown in their positions when the coupling is detached.

The chamber 13, which is an extension of chamber 11, is closed from the atmosphere by valve 14 and open to chamber 16 through valve 15, which is held open by collar 19 on stem of valve 14. There is therefore an open passage for air under pressure from chamber 10, through passage 17, chamber 16, valve 15, chamber 13, and passage 12 to chamber 11, and the air-pressure is therefore equal on the opposite sides of piston 6; but the area of piston 6 is diminished on the under side by the trunk that connects it to valve 5. There is, therefore, a preponderance of force on its upper side tending to keep the valve 6 closed. The spring 7 also tends to keep the valve closed.

When the coupling is properly connected to another, the lip 2' of the opposite coupling comes in contact with stem 18 (see Fig. 1) and pushes open valve 14, also lip 2 comes in contact with stem 18'. The opening of valve 14 permits valve 15 to be closed by its spring. Chambers 13 and 11 are now cut off from the source of air-pressure and opened to the atmosphere. The fluid-pressure underneath piston 6 will now raise the piston against the resistance of spring 7 and open valve 5, thus giving free passage through the gasket when the couplings are properly coupled together.

To uncouple the couplings the lips 2 2' are rotated away from the stems 18 18', thus allowing the spring to close valve 14 and open valve 15. This closes chambers 13 and 11 from the atmosphere and admits fluid-pressure from chamber 10 to chamber 11, which moves piston 6 to close valve 5.

From the above description it may be seen that when the couplings are detached the valve 5 is closed by a spring, and when the couplings are connected the valve 5 (in each coupling) is opened by air-pressure on a piston, and this piston is brought into action by the final rotary movement of the couplings in the act of coupling.

Having thus described my invention, what I claim as new, and desire to secure by Letters Patent, is—

In pipe couplings the abutting faces of which are rotated on each other in making or breaking a lock or union, a lift valve in each coupling, a piston to operate said valve and an auxiliary valve device actuated by some fixed part of the opposite coupling for admitting or exhausting air from the chamber containing said piston, substantially as set forth.

In testimony that I claim the foregoing as my invention I have signed my name, in presence of two witnesses, this 4th day of January, 1895.

ALBERT P. MASSEY.

Witnesses:
H. W. BOYER,
M. J. MORKIN.